United States Patent
Schroeder et al.

(10) Patent No.: US 11,904,654 B2
(45) Date of Patent: Feb. 20, 2024

(54) METHOD FOR OPERATING A REFRIGERANT CIRCUIT OF A COOLING SYSTEM OF A VEHICLE

(71) Applicant: AUDI AG, Ingolstadt (DE)

(72) Inventors: Dirk Schroeder, Manching (DE); Helmut Rottenkolber, Mindelstetten (DE)

(73) Assignee: AUDI AG, Ingolstadt (DE)

( * ) Notice: Subject to any disclaimer, the term of this patent is extended or adjusted under 35 U.S.C. 154(b) by 153 days.

(21) Appl. No.: 16/737,038

(22) Filed: Jan. 8, 2020

(65) Prior Publication Data
US 2020/0247213 A1 Aug. 6, 2020

(30) Foreign Application Priority Data
Feb. 5, 2019 (DE) ...................... 10 2019 201 427.5

(51) Int. Cl.
*B60H 1/00* (2006.01)
*B60H 1/22* (2006.01)
(Continued)

(52) U.S. Cl.
CPC ..... *B60H 1/00392* (2013.01); *B60H 1/00007* (2013.01); *B60H 1/00278* (2013.01);
(Continued)

(58) Field of Classification Search
CPC ...... F25B 41/22; F25B 41/31; F25B 2400/19; B60H 1/00899; B60H 2001/00928; B60H 2001/00949
See application file for complete search history.

(56) References Cited

U.S. PATENT DOCUMENTS

2006/0137388 A1* 6/2006 Kakehashi ............. B60H 1/323
62/513
2007/0151270 A1* 7/2007 Matsunaga ........ B60H 1/00885
62/216
(Continued)

FOREIGN PATENT DOCUMENTS

CN 1777780 A 5/2006
CN 1847753 A 10/2006
(Continued)

OTHER PUBLICATIONS

Vacuum—Wikipedia, https://en.wikipedia.org/wiki/Vacuum, 2021 (Year: 2021).*

(Continued)

*Primary Examiner* — Kun Kai Ma
(74) *Attorney, Agent, or Firm* — Maier & Maier, PLLC

(57) ABSTRACT

A method of operating a refrigerant circuit of a cooling system of a vehicle in cooling system mode, having a chiller branch which includes a chiller and a first expansion element connected upstream from it and being thermally coupled to a coolant circuit, at least one interior evaporator branch connected in parallel with the chiller branch, comprising an interior evaporator, a second expansion element connected upstream from it, and a segmentation element connected downstream from the interior evaporator, being adapted to prevent a backflow of refrigerant into the interior evaporator, a refrigerant compressor, and a condenser or gas cooler, wherein the cooling system mode is carried out in single chiller mode by closing the second expansion element and aspirating the refrigerant from the interior evaporator by the starting or already started refrigerant compressor.

11 Claims, 2 Drawing Sheets

(51) Int. Cl.
    *B60H 1/32*     (2006.01)
    *F25B 5/02*     (2006.01)
    *F25B 41/22*    (2021.01)

(52) U.S. Cl.
    CPC ..... *B60H 1/00428* (2013.01); *B60H 1/00899* (2013.01); *B60H 1/22* (2013.01); *B60H 1/32281* (2019.05); *F25B 5/02* (2013.01); *F25B 41/22* (2021.01); *B60H 2001/00928* (2013.01); *F25B 2400/19* (2013.01)

(56)         References Cited

U.S. PATENT DOCUMENTS

| 2010/0050672 | A1* | 3/2010 | Kurihara | F25B 9/008 62/190 |
| 2012/0085114 | A1* | 4/2012 | Graaf | B60H 1/143 62/238.7 |
| 2012/0125032 | A1 | 5/2012 | Graaf et al. | |
| 2017/0267063 | A1* | 9/2017 | Shan | B60H 1/32281 |
| 2018/0135902 | A1* | 5/2018 | Murase | F25B 41/31 |
| 2019/0143789 | A1* | 5/2019 | Brohl | F25B 40/00 62/200 |
| 2019/0225047 | A1* | 7/2019 | Porras | F25B 49/02 |
| 2020/0232673 | A1* | 7/2020 | Kozasa | F25B 30/02 |
| 2021/0245573 | A1* | 8/2021 | Benouali | F25B 5/02 |
| 2022/0324296 | A1* | 10/2022 | Schroeder | B60H 1/00807 |
| 2023/0234421 | A1* | 7/2023 | Rebinger | B60H 1/32281 165/104.32 |

FOREIGN PATENT DOCUMENTS

| CN | 101010547 A | 8/2007 | | |
| CN | 101726135 A | 6/2010 | | |
| CN | 201637183 U | 11/2010 | | |
| CN | 102037294 A | 4/2011 | | |
| CN | 201876025 U | 6/2011 | | |
| CN | 102563943 A | 7/2012 | | |
| CN | 102914099 A | 2/2013 | | |
| CN | 103033005 A | 4/2013 | | |
| CN | 103868268 A | 6/2014 | | |
| CN | 103998874 A | 8/2014 | | |
| CN | 105180494 A | * 12/2015 | ......... B60H 1/00899 |
| CN | 105180494 A | 12/2015 | | |
| CN | 106091457 A | 11/2016 | | |
| CN | 106352580 A | 1/2017 | | |
| DE | 102011118162 A1 | * 5/2013 | ......... B60H 1/00921 |
| DE | 102011118162 A1 | 5/2013 | | |
| DE | 10 2012 108 731 A1 | 3/2014 | | |
| DE | 10 2013 204 188 A1 | 9/2014 | | |
| DE | 102013021360 A1 | 6/2015 | | |
| DE | 102013021360 A1 | * 6/2015 | ............. F25B 49/02 |
| DE | 102015212550 A1 | 1/2017 | | |
| DE | 10 2015 015 125 A1 | 5/2017 | | |
| DE | 102016005782 A1 | 11/2017 | | |
| EP | 1 757 875 A2 | 2/2007 | | |
| EP | 1983170 B1 | 5/2016 | | |
| JP | 2007176302 A | 7/2007 | | |
| JP | 2014160594 A | 9/2014 | | |
| WO | 2014129097 A1 | 8/2014 | | |
| WO | 2019/021710 A1 | 1/2019 | | |

OTHER PUBLICATIONS

Examination Report dated Oct. 9, 2019 in corresponding German application No. 10 2019 201 427.5; 10 pages including Machine-generated English-language translation.

Chinese Office Action dated May 21, 2021, in connection with corresponding CN Application No. 202010080615.5 (18 pages, including machine-generated English translation).

* cited by examiner

METHOD FOR OPERATING A REFRIGERANT CIRCUIT OF A COOLING SYSTEM OF A VEHICLE

FIELD

The disclosure relates to a method for operating a refrigerant circuit of a cooling system of a vehicle in cooling system mode.

BACKGROUND

The use of refrigerant circuits in vehicle air conditioning systems is known, many variants providing a 2-evaporator system, namely, a front evaporator and a rear system evaporator. Depending on the circuit layout and the active operation of the respective heat transfer, the demand for active refrigerant needed in the refrigerant circuit will vary.

Electrified vehicles require, besides the front evaporator, at least one interior evaporator, a separate cooling device for the conditioning and temperature control of the energy accumulator, generally realized as a high-voltage battery. Such a cooling device can be realized by means of the refrigerant circuit and is known as an active battery cooling. Such a cooling device is realized as a refrigerant/coolant heat exchanger, working as an evaporator (by cooling an air flow) or as a chiller (by cooling a coolant flow).

The use of the refrigerant circuit of the vehicle cooling system in a heat pump mode for heating the passenger compartment is also known. In its function as a heat pump, the refrigerant circuit is capable of heating an air or water flow or a coolant flow and surrendering this heat directly or indirectly to the air of the passenger compartment. Depending on the operation of the vehicle cooling system, i.e., whether heating or cooling or the number of heat exchangers in active operation, the quantity of refrigerant actually required in the refrigerant circuit for optimal operation will also vary.

DE 10 2012 108 731 A1 describes a method for operating a refrigerant circuit of a vehicle air conditioning system for conditioning the incoming air flow of a passenger compartment of the vehicle, wherein the refrigerant circuit can be operated in both a cooling mode and in a heating mode by means of a heat pump function. The vehicle air conditioning system also comprises an engine cooling circuit, which is thermally coupled by a refrigerant/coolant heat exchanger as a chiller to the refrigerant circuit in order to realize a water heat pump. Both the chiller and the evaporator are fluidically connected downstream to a refrigerant compressor of the refrigerant circuit. In order to prevent a storing of refrigerant in the evaporator during the operation of the water heat pump, a check valve is arranged at the outlet side of the evaporator. By means of the condenser, an air heat pump is realized as a further heat pump with the surroundings of the vehicle as the heat source.

In a refrigerant circuit according to DE 10 2013 204 188 A1, the refrigerant compressed in a heat pump mode by a refrigerant compressor is returned once more to the refrigerant compressor across a heating register, an expansion element, an air/refrigerant heat exchanger which can operate as a heat pump condenser, a chiller with expansion element connected in front of it, and a low pressure refrigerant collector. The chiller here is connected in series after the heat pump condenser. In another circuit arrangement to implement the heat pump mode, the chiller is connected in parallel with the heat pump condenser. In this parallel arrangement, the capacity of the chiller can be regulated by means of its expansion element, connected in front of it. In a cooling mode of the refrigerant circuit, an interior evaporator is connected in parallel with the chiller by an expansion element. In this AC mode, an independent regulation of the chiller capacity on the refrigerant side is possible, for example in order to regulate a water-cooled battery of an electric vehicle.

DE 10 2015 015 125 A1 describes a vehicle air conditioning system with a refrigerant circuit which can operate as a heat pump circuit with heating function and as a refrigerant circuit with cooling function, comprising an interior evaporator, a refrigerant compressor, a first refrigerant condenser/gas cooler, a first expansion element associated with the interior evaporator and a refrigerant/coolant heat exchanger, furthermore a heating heat exchanger to implement the heating function, moreover an air conditioner, in which the interior evaporator and the heating heat exchanger are arranged, and finally a second refrigerant condenser/gas cooler connected after the refrigerant/coolant heat exchanger in the flow direction of the refrigerant, which surrenders heat in the heating mode to an air flow entering the vehicle interior and is arranged in the air conditioner between the interior evaporator and the coolant/air heat exchanger in the flow direction of the incoming air flow. A chiller with a further expansion element is connected in parallel with the evaporator branch consisting of interior evaporator and first expansion element.

If a chiller is operated alone in a refrigerant circuit, i.e., in the so-called single chiller mode, the system operation of the cooling system, depending on the cooling capacity demand for a high-voltage energy accumulator for example, will generally occur at a low pressure level above an evaporation pressure level, which is established when the interior cooling is active at the same time, i.e., when the interior evaporator is active. In detrimental manner, the higher low pressure results in a higher density of refrigerant at the low pressure side and at the same time there is a risk of premature overheating of the refrigerant after the chiller and thus of the refrigerant emerging at a low pressure refrigerant collector. In the event of using a refrigerant collector positioned at the high pressure side, the effect of a no longer adjustable undercooling may occur at the condenser or gas cooler, since this refrigerant collector as well is no longer adequately supplied with refrigerant. However, this effect can be detected by measurement and balanced out in special undercooling condensers (condenser/collector undercooling section).

SUMMARY

The problem which the disclosure proposes to solve is to indicate an improved method for operating a refrigerant circuit of a cooling system in the single chiller mode.

In this method of operating a refrigerant circuit of a cooling system of a vehicle in cooling system mode, having
  a chiller branch which comprises a chiller and a first expansion element connected upstream from it and being thermally coupled to a coolant circuit,
  at least one interior evaporator branch connected in parallel with the chiller branch, comprising an interior evaporator, a second expansion element connected upstream from it, and a segmentation element connected downstream from the interior evaporator, being adapted to prevent a backflow of refrigerant into the interior evaporator,
  a refrigerant compressor, and
  a condenser or gas cooler, wherein the cooling system mode is carried out in single chiller mode by closing the second expansion element and aspirating the refrigerant from the interior evaporator by means of the starting or already started refrigerant compressor.

In order to maximize the active refrigerant quantity, in this method according to the invention the at least one interior evaporator is drained of refrigerant, first of all by closing the second expansion element connected in front of this interior evaporator and suctioning the refrigerant from the interior evaporator by the suction pressure generated by the refrigerant compressor during its starting or during its operating. A backflow of the refrigerant into the interior evaporator is prevented by the segmentation element, which can be designed as a check valve, a shutoff valve, or a blockable expansion valve.

The cooling system can be operated in this single chiller mode at a higher low pressure level than the operating pressure level at the low pressure side during an operation of the interior evaporator. In this way, a lower pressure ratio is established between high pressure and low pressure of the refrigerant circuit during a system operation with lower compressor speed, resulting in higher efficiency.

According to one especially advantageous modification of the invention, in order to accomplish a high suction pressure when the refrigerant compressor is active, the low pressure is lowered by means of the first expansion element and a raising of the refrigerant volume flow by means of the refrigerant compressor below the chiller operating pressure at the low pressure side during a defined negative pressure period, the chiller operating pressure at the low pressure side corresponding to the low pressure at which the required cooling capacity is generated by the chiller.

In an electrical refrigerant compressor, which is powered by an electric drive, the increasing of the volume flow occurs by increasing the rpm, while in a mechanical refrigerant compressor which is powered by a drive machine of the vehicle the delivery quantity and thus the refrigerant volume flow occurs by adjusting the swivel angle of the swash plate of the refrigerant compressor, thereby directly adjusting the piston stroke in combination with the drive speed of the refrigerant compressor.

As the active refrigerant compressor is meant a refrigerant compressor either starting up or already being in operation, with which the required refrigerant volume flow of the low pressure is adjusted. The required cooling capacity provided at the chiller operating pressure on the low pressure side corresponds to the cooling capacity demand of the component being cooled by the chiller, being for example a high-voltage energy accumulator. The lowering of the low pressure below the chiller operating pressure on the low pressure side occurs at the same time, on the one hand by an increasing of the refrigerant volume flow and on the other hand by means of the first expansion element, which follows the commands of a controller for adjusting a regulation target such as a target temperature of the coolant and regulates the refrigerant volume flow via the chiller when necessary. This prevents the battery from being subject to a coolant which is too cold, falling below the permissible temperature differences. A high suction effect is achieved with such a low pressure briefly adjusted below the actual chiller operating pressure on the low pressure side.

A further improvement in the suctioning effect of refrigerant from the deactivated interior evaporator branch or other sections of a cooling system that are segmented and inactive for the single chiller mode is accomplished in that the low pressure during the negative pressure period is lowered to a minimum possible low pressure value, this minimum possible low pressure value being determined such that the permissible system limits of the refrigerant circuit are maintained at the low pressure side. In order to achieve this minimum possible low pressure value, the refrigerant volume flow of the refrigerant compressor is raised to a value at which the refrigerant compressor has achieved its maximum delivery volume.

The low pressure is increased again to the chiller operating pressure on the low pressure side at the end of the negative pressure period by means of the first expansion element (AE1) and the reduction of the refrigerant volume flow set by the refrigerant compressor at which the required cooling capacity is generated by the chiller.

Preferably, the defined negative pressure period corresponds to the time until the low pressure in the interior evaporator branch being drained or other sections of a cooling system that are segmented and inactive for the single chiller mode adjusts to the low pressure set by the refrigerant compressor.

Of course, the method according to the invention may also be realized in cooling systems with a heat pump functionality.

BRIEF DESCRIPTION OF THE DRAWINGS

Further benefits, features and details of the invention will emerge from the following description of preferred embodiments and also with the aid of the drawings of a system layout chosen as an example, having at least one system section of a cooling system that is segmentable and inactive for the single chiller mode. There are shown.

DETAILED DESCRIPTION

Figure 1:
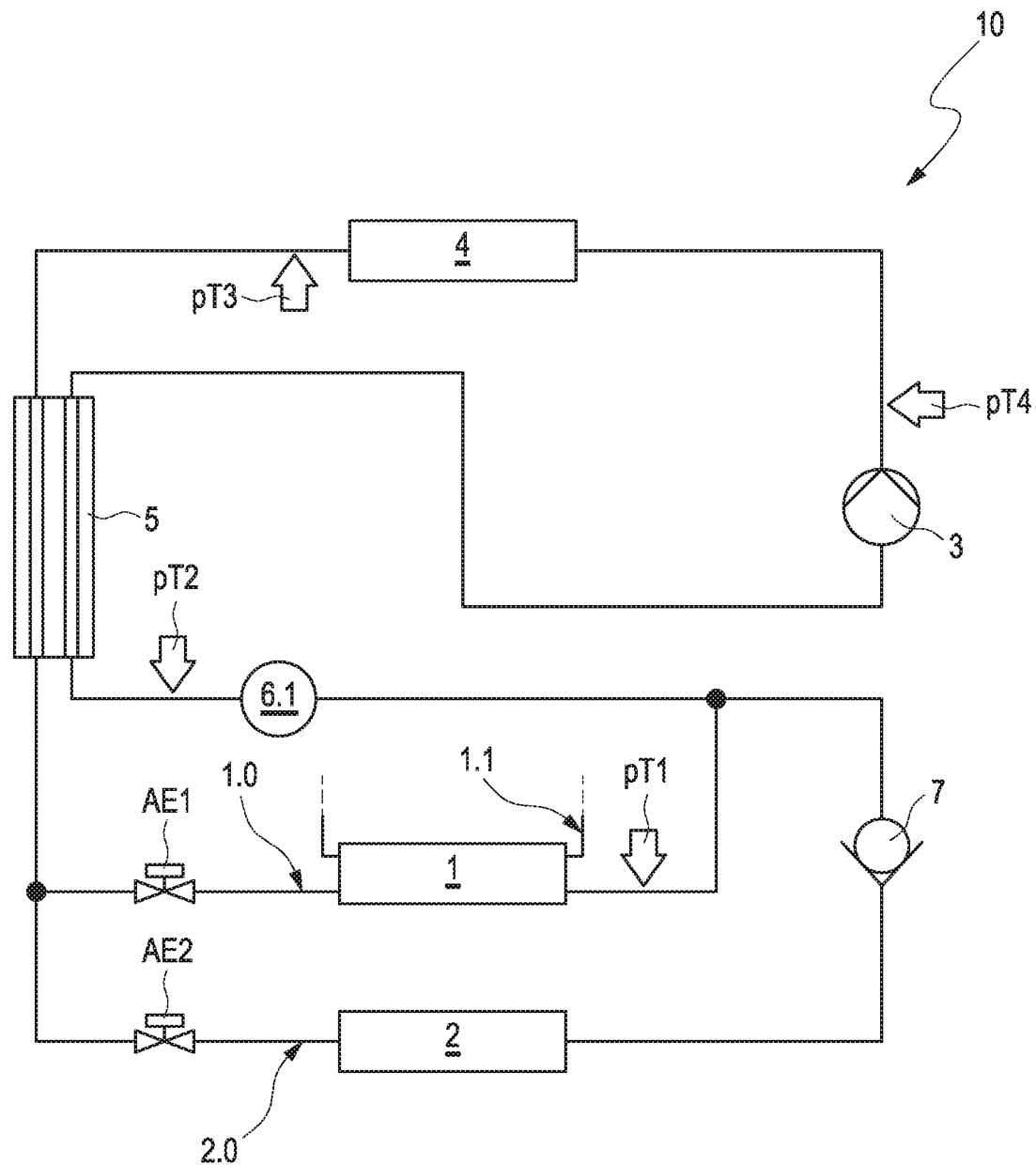
FIG. 1 a circuit arrangement of a refrigerant circuit to implement an exemplary embodiment of the method according to the invention using a refrigerant collector situated on the low pressure side, and FIG. 2 an alternative circuit arrangement to that of FIG. 1 to implement an exemplary embodiment of the method according to the invention using a refrigerant collector situated on the high pressure side.
Figure 2:
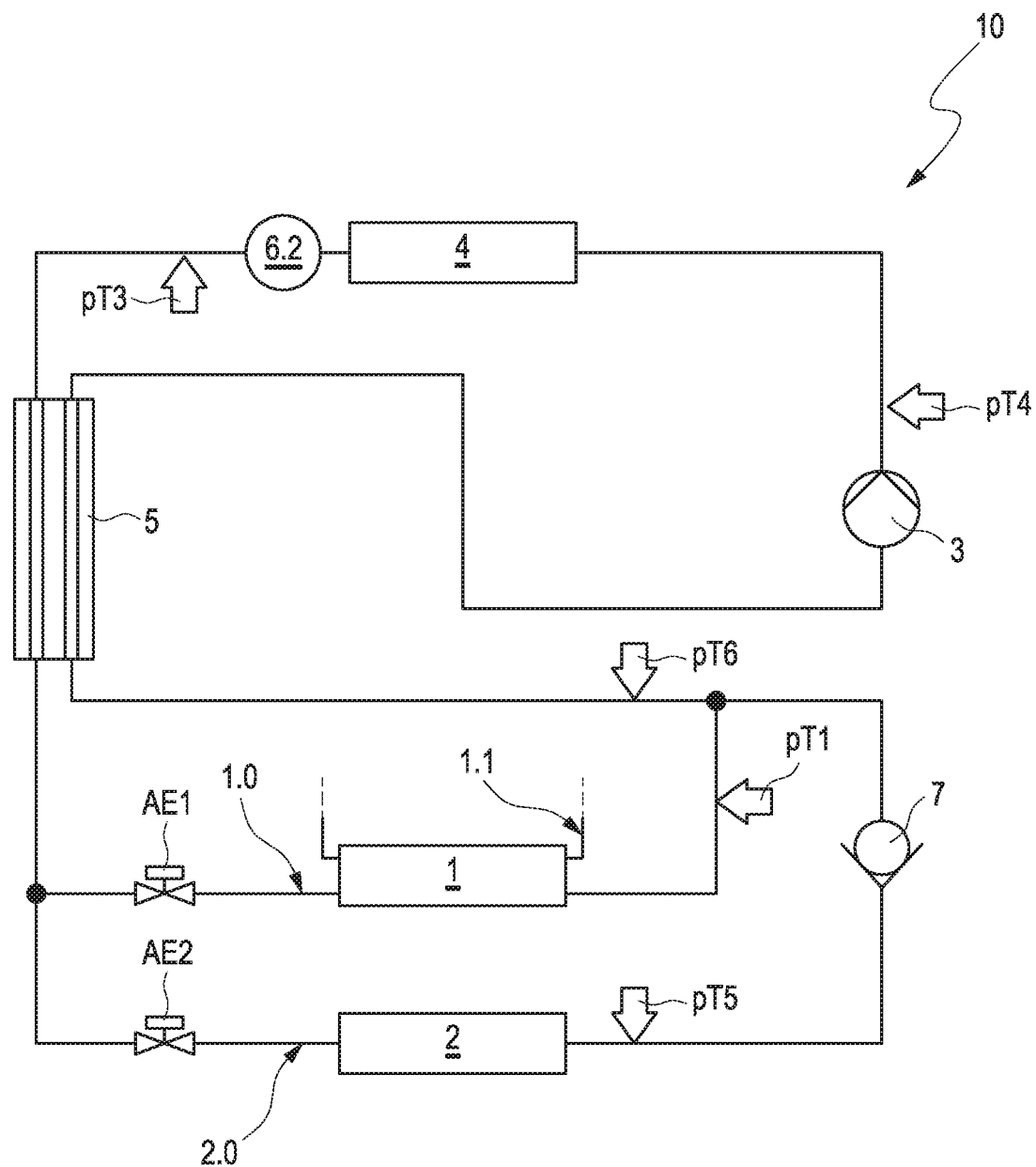

FIGS. 1 and 2 for sake of simplicity each show a refrigerant circuit 10 of a cooling system of a vehicle provided for the pure AC operation (cooling system mode). The functional expansion to include a heat pump mode has not been done, since the basic idea to describe the method is already fully understandable with the simple circuit concept and the function to a system with heat pump functionality and its inactive sectors can be applied directly. These refrigerant circuits 10 are constructed in an identical basic structure and differ each time in the arrangement of a refrigerant collector as the low pressure or high pressure refrigerant collector. It should be mentioned that a refrigerant collector arranged on the low pressure side can be used for cooling systems operating either below or above the critical level, while a high pressure collector is used primarily in systems working purely below the critical level.

The refrigerant circuit 10 of FIGS. 1 and 2 consists of the following components:
  a refrigerant compressor 3,
  an exterior condenser 4 or gas cooler 4, which is fluidically connected to the high pressure outlet of the refrigerant compressor 3,
  a chiller branch 1.0 with a chiller 1 provided to cool an electrical component (such as a high-voltage battery, an electric drive component, etc.) of the vehicle, a first expansion element AE1 connected in front of the chiller 1 having a shutoff function and designed as an electrical expansion valve, and a first pressure-temperature sensor pT1 connected after the chiller 1, wherein the chiller 1 is thermally coupled to a coolant circuit 1.1 for cooling the electrical component, an interior evaporator branch 2.0 with an interior evaporator 2 and a second expansion element AE2 connected in front of same and designed with a shutoff function, where the interior evaporator branch 2.0 is connected in parallel with the chiller branch 1.0, a refrigerant collector 6.1 or 6.2, which according to FIGS. 1 and 2 is connected as a low pressure refrigerant collector 6.1 with a second pressure-temperature sensor pT2 connected after it, located downstream from the chiller branch 1.0 and the interior evaporator branch 2.0, and according to FIG. 2 connected as a high pressure refrigerant collector 6.2 downstream from the exterior condenser 4 or gas cooler 4, an interior heat exchanger 5, whose high pressure side fluidically connects the condenser 4 or gas cooler 4 to the chiller branch 1.0 and the interior evaporator branch 2.0, while its low pressure section according to FIG. 1 is incorporated in the refrigerant circuit 10 between the low pressure refrigerant collector 6.1 and the refrigerant compressor 3 and according to FIG. 2 between the chiller branch 1.0 and the refrigerant compressor 3, a third pressure-temperature sensor pT3 connected after the condenser 4 or gas cooler 4, a fourth pressure-temperature sensor pT4 connected after the refrigerant compressor 3, a fifth pressure-temperature sensor pT5 connected per FIG. 2 downstream from the interior evaporator 2, and a sixth pressure-temperature sensor pT6 optionally connected downstream from the parallel circuit of the chiller branch 1.0 and the interior evaporator 2.0 per FIG. 2, depending on the operating strategy, and connected in front of the compressor 3.

If the high pressure refrigerant collector 6.2 is integrated in the condenser 4 or gas cooler 4, the third pressure-temperature sensor pT3 should be provided downstream from the condenser 4 or gas cooler 4. But since such systems are generally systems designed exclusively for subcritical operation, the third pressure-temperature sensor pT3 can be omitted in theory Finally, a climate controller is provided as the control unit for the refrigerant circuit 10 of FIGS. 1 and 2 (not shown in the figures), receiving input signals for processing, such as actual values of pressure-temperature sensors, in order to produce command signals or target values as the output signals for control of the individual components of the refrigerant circuit 10.

The interior evaporator branch 2.0 according to FIGS. 1 and 2 comprises a check valve 7. Alternatively, a shutoff valve or a blockable third expansion element can be provided in this position. The interior evaporator branch 2.0 is therefore bounded by the second expansion element AE2 and by the check valve 7.

First of all, the single chiller operation of the refrigerant circuit 10 of FIGS. 1 and 2 shall be described, during which only the chiller 1 is operated for the exclusive component cooling (such as the high-voltage battery) and for this the interior evaporator branch 2.0 is blocked by means of the second expansion element AE2.

In order for the maximum active refrigerating quantity to be available for this single chiller operation and thus a maximum cooling capacity can be generated for the coolant circuit 1.1, first of all refrigerant is sucked from the interior evaporator 2 by means of the suction pressure generated by the refrigerant compressor 3 with the refrigerant compressor 3 starting up or already active and the second expansion element AE2 blocked. A backflow of refrigerant into the interior evaporator 2 is prevented by the blocked second expansion element AE2 and the check valve 7.

The suction process generally continues until the low pressure level set by means of the refrigerant compressor 3 is approximately established in the interior evaporator branch 2.0 being drained and this is dependent on the ambient conditions, whereby a faster draining can be achieved when temperatures are warm as opposed to when conditions are more cool, since cooler conditions support a refrigerant condensation and thus more refrigerant has to be moved around.

After the suction process, the evaporation temperature of the chiller 1 and thus the target temperature of the coolant is regulated by means of the refrigerant compressor 3.

In order to achieve a higher suction pressure, the low pressure is decreased below the chiller operating pressure on the low pressure side during a defined negative pressure period with the starting of the refrigerant compressor 3 or with the refrigerant compressor 3 already active and with the second expansion element AE2 blocked by means of the interaction of the first expansion element AE1 and with the increasing of the refrigerant volume flow of the refrigerant compressor 3. By the chiller operating pressure on the low pressure side is meant the low pressure at which the required cooling capacity is generated by the chiller 1. The required cooling capacity which is provided by the chiller 1 at the chiller operating pressure on the low pressure side corresponds to the cooling capacity demand of the component being cooled by the chiller 1, which is a high-voltage energy accumulator for example. The decreasing of the low pressure below the chiller operating pressure on the low pressure side occurs at the same time by increasing the rpm of the refrigerant compressor 3 on the one hand and by means of the first expansion element AE1, whereby this element follows the command of a controller to achieve a regulating target, such as a target temperature of the coolant, and it regulates the refrigerant flow across the chiller 1 when necessary. This prevents the battery from being exposed to coolant which is too cold, falling below permissible temperature differences.

The decreasing of the low pressure can also be done below an interior evaporator operating pressure on the low pressure side, which is established when the interior evaporator 2 is active or when both the interior evaporator 2 is active and the chiller 1 is also active. This interior evaporator operating pressure on the low pressure side corresponds to the low pressure at which the required cooling capacity is created by the interior evaporator corresponding to a given air outflow temperature of an incoming air stream in the vehicle interior.

This interior evaporator operating pressure is 37 bar, for example for a refrigerant R744 ($CO_2$), or 3.3 bar for a chemical refrigerant (R1234yf), in order to achieve an air outlet temperature of around 3° C.

The low pressure decreased below the operating pressure on the low pressure side is 30 bar for a refrigerant R744 or 2.5 bar for a chemical refrigerant, for example.

A further improvement of the suction effect of refrigerant from the nonoperating interior evaporator branch 2.0 is accomplished in that the low pressure during the negative pressure period is reduced to a minimum possible low pressure value, where this minimum possible low pressure value is determined such that the permissible system limits on the low pressure side are not transgressed. In order to achieve this minimum possible low pressure value, the refrigerant volume flow of the refrigerant compressor 3 is increased to a value such that the compressor reaches its maximum delivery volume.

The defined negative pressure period is 60 seconds, for example, and it corresponds to the period of time until the low pressure in the interior evaporator branch 2.0 being drained is brought in line with the low pressure established by the refrigerant compressor 3. The negative pressure period is determined primarily from the ambient conditions and an associated estimation in terms of a possible refrigerant movement potential and the associated possible time to bring this refrigerant back into the active line.

After this negative pressure period expires, the low pressure is once more increased to the operating pressure on the low pressure side for the single chiller mode in order to achieve a required coolant temperature at the outlet of the chiller by a reduction of the refrigerant volume flow required by the refrigerant compressor 3. Upon complete suction of the refrigerant from the interior evaporator branch 2.0, this chiller operating pressure continues to remain after the reduction of the refrigerant volume flow and the associated rise in the low pressure to the chiller operating pressure. A rise in the pressure level may be a signal for further remaining and not entirely suctioned refrigerant, but also for possible valve leakage and inflowing refrigerant.

It should be mentioned in addition that lower pressures may also be adjusted permanently in exceptional instances (need for high cooling capacity) in this same mode for a single chiller operation, and they may lie below the level for an interior evaporator operation.

Thus, a maximum refrigerant fill quantity is available for this single chiller operation of the refrigerant circuit 10 per FIGS. 1 and 2.

In such a single chiller operation of the refrigerant circuit 10 per FIGS. 1 and 2, the refrigerant compressed to high pressure and flows from the refrigerant compressor 3 to the exterior condenser 4 or gas cooler 4, then to the high pressure section of the interior heat exchanger 5, and it is then expanded by means of the first expansion element AE1 into the chiller branch 1.0. From the chiller branch 1.0, the refrigerant flows across the low pressure refrigerant collector 6.1 and the low pressure section of the interior heat exchanger 5 back to the refrigerant compressor 3. In this process, the heat transferred from the coolant circuit 1.1 to the refrigerant is transferred by means of the condenser 4 or the gas cooler 4 to the surrounding air of the vehicle.

The low pressure refrigerant collector 6.1 of the refrigerant circuit 10 has the task of separating the gaseous and the liquid phase of the incoming refrigerant from each other and storing up the liquid refrigerant as a buffer volume or placing it in circulation, depending on the refrigerant quantity needed by the system.

Moreover, such a low pressure refrigerant collector 6.1 regulates the vapor content to a constant value at the refrigerant outlet of the chiller 1 when the refrigerant circuit 10 is placed in operation or when the load is switched from a dual operation of the evaporator (i.e., chiller 1 and interior evaporator 2) to the single chiller operation. The vapor content established by the low pressure refrigerant collector 6.1 is established in the steady state of the refrigerant circuit 10 both at the outlet of the chiller 1 and at the refrigerant outlet of the low pressure refrigerant collector 6.1. In this way, the refrigerant condition at the refrigerant outlet of the chiller 1 thanks to the explained attribute of the low pressure refrigerant collector 6.1 is operated near the dew line on the curve of the constant vapor content (such as 90%). At the same time, this means that the value of the overheating during normal system operation is zero. Therefore, the first expansion element AE1 brings about either an undercooling control by means of the third pressure-temperature sensor pT3 or a regulation to an optimal high pressure, depending on a subcritical or supercritical system.

The undercooling control is done in such a way that pressure and temperature are detected by the third pressure-temperature sensor pT3 at the outlet of the condenser 4 and the amount of the undercooling is determined from these values. If the actual value moves above the target value, the first expansion element AE1 is opened until the target value has been reached. If the actual value is less than the target value, the first expansion element AE1 is closed until the target value is established.

The control to an optimal high pressure means that pressure and temperature are detected by the third pressure-temperature sensor pT3 at the outlet of the gas cooler 4 and the amount of the target high pressure is determined from these values. If the actual value moves above the target value, the first expansion element AE1 is opened until the target value is reached. If the actual value is less than the target value, the first expansion element AE1 is closed until the target value is established.

If the function of an underfilling detection is performed in the refrigerant circuit 10 of FIG. 1 by means of the second pressure-temperature sensor pT2, the first pressure-temperature sensor pT1 is not absolutely required in the single chiller mode since, as explained above, nearly the same pressure and temperature conditions are present at the outlet of the low pressure refrigerant collector 6.1 and at the refrigerant outlet of the chiller 1. Furthermore, if the operation of the chiller 1 is always strictly separate from the operation of a further evaporator, i.e., the interior evaporator 2, one may entirely do without the first pressure-temperature sensor pT1 for a refrigerant circuit 10 per FIG. 1. The use of this first pressure-temperature sensor pT1 is essential if a parallel operation of at least two evaporators is provided, i.e., the chiller 1 and the interior evaporator 2.

Alternatively, such a pressure-temperature sensor PT1 can also be provided not at the outlet of the chiller 1, but at the outlet of the interior evaporator 2, and furthermore it is even possible to provide each of the two evaporators 1 and 2 with a pressure-temperature sensor.

In the single chiller mode, especially also in dependence on the inlet temperature of the coolant in the chiller 1, during a regulation to undercooling or to an optimal high pressure, significantly higher low pressures are established in the refrigerant circuit 10 as compared to a multi-evaporator operation by means of the chiller 1 and the interior evaporator 2. Especially at high inlet temperatures in the cooling water of the coolant circuit 1.1 of the chiller 1, high values are achieved in the low pressure, which decrease with dropping inlet temperature or with increase in the cooling demand (water inlet/return flow temperature difference). The low pressure in the refrigerant circuit 10 rises especially during increasing inlet temperature of the coolant at the chiller 1.

With rising low pressure of the refrigerant, its density also increases and thus results in a higher refrigerant demand in the low pressure section of the refrigerant circuit 10, i.e., in the extreme case there will be a refrigerant underfilling. Hence, in the single chiller mode the refrigerant at the refrigerant outlet of the chiller 1 can no longer be operated in the two-phase zone of the refrigerant and thus to the left of and near the dew line when the low pressure refrigerant collector 6.1 is empty, i.e., no more refrigerant can be delivered and its reservoir is depleted. If the low pressure refrigerant collector 6.1 is emptied, there will be an increasing overheating of the refrigerant at the refrigerant outlet of the chiller 1, and thus also at the outlet of the low pressure refrigerant collector 6.1.

With rising density of the refrigerant and thus of the mass flow, a torque overloading may also occur at the refrigerant compressor 3.

As soon as such a torque overloading of the refrigerant compressor 3 and/or an increasing overheating of the refrigerant at the refrigerant outlet of the chiller 1 is detected by means of the first pressure-temperature sensor pT1 (or optionally by means of the second pressure-temperature sensor pT2), a lowering of the low pressure is done by a regulatory intervention at the refrigerant compressor 3, especially one designed as an electrical compressor, by adapting the rpm of the refrigerant compressor 3 and thus the cooling capacity. The lowering of the low pressures is done in dependence on the ambient condition and the load situation at the chiller 1, i.e., the low pressure in the system is reduced until such time as the overheating or torque problems are no longer detected. With this limiting of the maximum permissible low pressure at the upper bound, the degree of freedom of the low pressure of increasing in arbitrary manner is restricted. It should be noted that, with the decreasing of the low pressure level, the driving temperature gradient between refrigerant and coolant is now also raised, thereby resulting in a boosting of the cooling capacity and hence a lowering of the coolant temperature.

A further negative property which may occur in connection with an increasing overheating is manifested by a worsening of the return oil transport to the refrigerant compressor 3, since now the oil is increasingly stockpiled in the low pressure refrigerant collector 6.1 and no more transport agent to the refrigerant compressor 3 is available on account of the lacking liquid refrigerant phase with which the oil enters into a mixture.

Alternatively, the low pressure is limited to a maximum low pressure value by control of the refrigerant compressor 3, so that a further rise in the low pressure at the refrigerant outlet of the chiller 1 is prevented. The maximum low pressure value is established in dependence on ambient conditions and the cooling capacity of the chiller 1, i.e., the evaporation temperature should be set at a value below the ambient temperature upon starting the refrigerant circuit 10 after the suctioning of refrigerant from the interior evaporator branch 2.0 or be oriented to this value at the beginning, and during ongoing operation the efficiency-optimized operating point should be approached, once again taking account of the values of the first pressure-temperature sensor pT1.

With the reduction of the low pressure, the evaporation temperature of the refrigerant in the chiller 1 is also reduced. In order to restore the cooling capacity of the chiller 1 generated prior to the reduction of the low pressure, this cooling capacity is reestablished by an interaction of refrigerant compressor 3 and the first expansion element AE1 by responding to the new boundary conditions by increasing the stroke or rpm and travel of the first expansion element AE1, i.e., generally by a further throttling.

In a single chiller operation of the refrigerant circuit 10 of FIG. 2, the refrigerant compressed to high pressure flows from the refrigerant compressor 3 to the exterior condenser 4 or gas cooler 4, then to the high pressure refrigerant collector 6.2 and thereafter to the high pressure section of the interior heat exchanger 5, being then expanded by means of the first expansion element AE1 into the chiller branch 1.0. From the chiller branch 1.0, the refrigerant flows across the low pressure section of the interior heat exchanger 5 back to the refrigerant compressor 3. The heat transferred from the coolant circuit 1.1 to the refrigerant in this process is surrendered to the air surrounding the vehicle, along with the energy introduced at the compressor side, by means of the condenser 4 or the gas cooler 4.

The condenser 4 may also be designed with an integrated high pressure refrigerant collector 6.2, and generally the high pressure refrigerant collector 6.2 is followed downstream by an undercooling section, consisting of a few flat tubes and integrated in the ambient heat exchanger, whose outlet downstream leads to the high pressure section of the interior heat exchanger 5.

In this single chiller mode, after the suctioning of refrigerant from the interior evaporator branch 2.0 the overheating at the refrigerant outlet of the chiller 1 in a refrigerant circuit 10 according to FIG. 2 is likewise operated near the dew line of the refrigerant. The suctioning occurs in the above described manner by using the suction pressure generated by the refrigerant compressor 3, with the shutoff element AE2 closed, to suction the refrigerant, or by lowering the low pressure below the target operating pressure on the low pressure side or to a minimum possible low pressure value in order to increase the suction pressure of the refrigerant compressor 3.

The overheating at the refrigerant outlet of the chiller 1 is regulated to a value between 3 and 5 K by means of the first expansion element AE1, the degree of overheating being detected by means of the first pressure-temperature sensor pT1. At a maximum cooling capacity demand for the chiller 1, the first expansion element AE1 designed as an electric expansion valve is set at a minimum, yet still safe and detectable overheating value, while at the same time the refrigerant compressor 3 establishes a minimum low pressure.

In the single chiller mode, significantly higher low pressures are established in the refrigerant circuit 10 during such a regulating process as compared to a multi-evaporator operation by means of the chiller 1 and the interior evaporator 2. The low pressure in the refrigerant circuit 10 rises especially with increasing coolant inlet temperature at the inlet of the chiller 1.

With rising low pressure of the refrigerant, its density also increases and thus results in a higher refrigerant demand in the low pressure section of the refrigerant circuit, i.e., there will be a refrigerant underfilling. Hence, in the single chiller mode the refrigerant at the refrigerant outlet of the chiller 1 can no longer be operated near, since there will be an increasing overheating of the refrigerant at the refrigerant outlet of the chiller 1.

With rising density of the refrigerant, a torque overloading may also occur at the refrigerant compressor 3.

As soon as such a torque overloading of the refrigerant compressor 3 and/or an increasing overheating of the refrigerant at the refrigerant outlet of the chiller 1 is detected by means of the first pressure-temperature sensor pT1, a lowering of the low pressure is done by a regulatory intervention at the refrigerant compressor 3, designed as an electrical compressor, by reducing the rpm of the refrigerant compressor 3 and thus the cooling capacity. The lowering of the low pressures is done in dependence on the ambient condition and the load situation at the chiller 1, i.e., the low pressure in the system is reduced until such time as the overheating moves in the target range and/or the torque overload is no longer detected. With the limiting of the maximum permissible low pressure at the upper bound, the degree of freedom of the low pressure to increase in arbitrary manner is restricted.

At the outlet of the interior evaporator 2, the pressure-temperature sensor pT5 is responsible for monitoring the overheating control of the refrigerant at the outlet of the interior evaporator 2.

Alternatively, the low pressure is limited to a maximum low pressure value by control of the refrigerant compressor 3, so that a further rise in the low pressure at the refrigerant outlet of the chiller 1 is prevented. The maximum low pressure value is established in dependence on ambient conditions and the cooling capacity of the chiller 1, i.e., the evaporation temperature should be set at a value below the ambient temperature upon starting the refrigerant circuit 10 after the suctioning of refrigerant from the interior evaporator 2 or be oriented to this value at the beginning, and during ongoing operation the efficiency-optimized operating point should be approached, once again taking account of the values at the first pressure-temperature sensor pT1.

With the reduction of the low pressure, the evaporation temperature of the refrigerant in the chiller 1 is also reduced. In order to restore the cooling capacity of the chiller 1 generated prior to the reduction of the low pressure, this cooling capacity is reestablished by an interaction of refrigerant compressor 3 and the first expansion element AE1 by responding to the new boundary conditions by increasing the stroke or rpm and travel of the first expansion element AE1, i.e., generally by a further throttling.

It should be noted that, in the event of constantly separate operation of the chiller 1 and the interior evaporator 2, i.e., the two heat exchangers are never operated at the same time, the two pressure-temperature sensors pT1 and pT5 are eliminated and can be replaced by one pressure-temperature sensor pT6 downstream from the node point of the chiller branch 1.0 and the interior evaporator branch 2.0.

The check valve 7 connected after the interior evaporator 2 in FIGS. 1 and 2 prevents a back movement of refrigerant into the interior evaporator 2 in the single chiller mode, especially after the suctioning is complete. If this check valve 7 is replaced by a shutoff element or an expansion element, for example, the latter will perform the same function.

The refrigerant circuits 10 of FIGS. 1 and 2 may of course be operated also in a multi-evaporator mode, i.e., in a parallel operation of the chiller 1 and the interior evaporator 2. Since such a multi-evaporator mode is known to the skilled person, a detailed presentation shall not be given.

In the refrigerant circuit 10 of FIGS. 1 and 2, instead of the first expansion element AE1 designed as an electrical expansion valve in the single chiller mode, this can also be designed as a disconnectable thermal expansion element or as a disconnectable orifice tube with defined orifice cross section. The precise setting of the coolant temperature of the coolant circuit 1.1 of the chiller 1 must therefore be done when necessary by means of a clocked operation of the expansion element about the target value of the coolant outlet temperature at the chiller.

In connection with the high pressure refrigerant collector 6.2 it should be noted that the collector bottle can also be integrated in the condenser 4, before the flow occurs downstream through the subcooling section integrated in the condenser 4. In this layout, which cannot be used in this design for the embodiment as an air heat pump, the third pressure-temperature sensor pT3 may be omitted, since an undercooling of the refrigerant is already established spontaneously by means of the condenser 4, in which the high pressure refrigerant collector 6.2 and the subcooling section are integrated. However, this pressure-temperature sensor pT3 can detect the aforementioned undercooling and therefore can prompt a filling of the entire condenser layout with refrigerant, if it should tend toward zero or disappear. Consequently, a disappearance of the undercooling will occur only at a later time with increasing suctioning of refrigerant from the inactive sections.

Moreover, the described methods are also realized in a refrigerant circuit 10 with heat pump function. In these applications, a heat register section will be present besides an interior evaporator branch 2.0.

Finally, the described methods may be used for all known refrigerants, such as R744, R134a, R1234yf and so forth, while only the low pressure refrigerant collector 6.1 will be considered especially for R744 systems.

The invention claimed is:

1. A method of operating a refrigerant circuit of a cooling system of a vehicle in cooling system mode, the cooling system comprising:
   a chiller branch coupled to a coolant circuit and comprising a first expansion element connected upstream from a chiller;
   at least one interior evaporator branch connected in parallel with the chiller branch, the at least one interior evaporator branch comprising a second expansion element connected upstream from an interior evaporator and a segmentation element connected downstream from the interior evaporator, wherein the segmentation element is configured to prevent a backflow of refrigerant into the interior evaporator;
   a refrigerant compressor; and
   a condenser or gas cooler,
   the method comprising:
   closing the second expansion element so as to operate the cooling system in a single chiller mode:
   increasing a flow rate of the refrigerant compressor;
   controlling the first expansion element so that pressure downstream of the first expansion element is reduced below a target operating pressure of the chiller; and
   returning pressure downstream of the first expansion element to the target operating pressure of the chiller once the interior evaporator is aspirated to a predetermined degree,
   wherein closing of the second expansion element, increasing the flow rate of the refrigerant compressor, and control of the first expansion element aspirates the refrigerant from the interior evaporator, and
   wherein the interior evaporator remains aspirated when pressure downstream of the first expansion element is returned to the target operating pressure.

2. The method according to claim 1, wherein, during aspiration of the refrigerant, a cooling capacity of the chiller is maintained by compensating for a reduction in the cooling capacity caused by the reduction of the pressure downstream of the first expansion element with an increase in the cooling capacity caused by the increase in the flow rate of the refrigerant compressor.

3. The method according to claim 2, wherein, during aspiration of the refrigerant, the flow rate of the refrigerant compressor is maximized, thereby establishing a minimum possible low pressure downstream of the first expansion element whereby the cooling capacity of the chiller is maintained.

4. The method according to claim 1, wherein aspiration of the refrigerant proceeds until a pressure in the interior evaporator branch being drained reaches a predetermined pressure value.

5. The method according to claim 4, wherein the predetermined pressure value is set by the refrigerant compressor.

6. The method according to claim 1, wherein aspiration of the refrigerant proceeds for a predetermined amount of time.

7. The method according to claim 6, wherein the predetermined amount of time is 60 seconds.

8. The method according to claim 6, wherein the predetermined amount of time is dependent on at least one ambient condition of the cooling system.

9. The method according to claim 1, wherein a degree to which pressure downstream of the first expansion element is reduced during aspiration of the refrigerant depends on at least one ambient condition of the cooling system.

10. The method according to claim 1, wherein, during aspiration of the refrigerant, the first expansion element is controlled to maintain a regulating target.

11. The method according to claim 10, wherein the regulating target is a target temperature of the refrigerant.

* * * * *